United States Patent
Bertetti

(10) Patent No.: US 6,339,964 B1
(45) Date of Patent: Jan. 22, 2002

(54) DEVICE FOR MEASURING THE RELATIVE REVOLVING SPEED BETWEEN THE RACES OF A ROLLING CONTACT BEARING

(75) Inventor: Paolo Bertetti, Turin (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 09/024,346

(22) Filed: Feb. 17, 1998

(30) Foreign Application Priority Data

Oct. 3, 1997 (IT) ......................................... TO97A0877

(51) Int. Cl.$^7$ ................................................. G01L 3/02
(52) U.S. Cl. ................................................. 73/862.334
(58) Field of Search ..................... 73/862.334, 862.333; 324/174

(56) References Cited

U.S. PATENT DOCUMENTS

| | | |
|---|---|---|
| 4,820,978 A | 4/1989 | Hirota |
| 5,293,124 A * | 3/1994 | Caillaut et al. ............. 324/173 |
| 5,431,413 A | 7/1995 | Hajzler |
| 5,434,503 A * | 7/1995 | Rigaux et al. ............. 324/174 |
| 5,530,344 A | 6/1996 | Caillaut et al. |
| 5,969,518 A * | 10/1999 | Merklein et al. ........... 324/173 |

FOREIGN PATENT DOCUMENTS

| | | |
|---|---|---|
| EP | A-0 647 851 | 10/1994 |
| EP | A-0 725 242 | 8/1996 |
| EP | 0 745 857 | 12/1996 |
| FR | 2690989 | 11/1993 |

OTHER PUBLICATIONS

International Search Report for EP 98 11 2231.
English abtstract for EP–A–0 647 851.
English abtstract for EP–A–0 725 242.

* cited by examiner

*Primary Examiner*—Benjamin R. Fuller
*Assistant Examiner*—Jewel V. Thompson
(74) *Attorney, Agent, or Firm*—Merchant & Gould P.C.

(57) ABSTRACT

A rolling contact bearing is fitted at one end thereof with a sealing device and a device for measuring the relative revolving speed between the bearing races. The sealing device comprises a metal insert (10) of annular shape fast for rotation with the rotating bearing race (11). The speed measuring device comprises a multipolar ring (18) mounted to the metal insert (10) and provided with magnetized segments of alternate polarity in the circumferential direction. The multipolar ring (18) is a ring of plastoferrite co-molded to the metal insert (10). Formed on the insert (10) is formed a plurality of radial recesses (21) adapted to yield, in the co-molding operation, a corresponding plurality of radial protrusions (22) in the multipolar ring (18). The radial recesses and protrusions (21, 22) are mutually engaged so as to prevent relative rotation between the multipolar ring (18) and the metal insert (10), but allow relative radial displacement owing to thermal variations.

4 Claims, 2 Drawing Sheets

DEVICE FOR MEASURING THE RELATIVE REVOLVING SPEED BETWEEN THE RACES OF A ROLLING CONTACT BEARING

DESCRIPTION

The present invention relates to a device for measuring the relative rotational speed between the races of a rolling contact bearing.

BACKGROUND OF THE INVENTION

There are known rolling contact bearings fitted with a sealing device comprised of a metal annular insert mounted to the rotating race of the bearing. In some applications, such insert forms a radial flange on the outer wall of which there is fixed, in different manners, a multipolar ring (encoder wheel) with magnetized segments of alternate polarity in the circumferential direction. The encoder wheel forms part of a device for measuring the relative rotational speed between the bearing races. The encoder wheel faces a sensor secured to a stationary part of the bearing and responsive to variations of the magnetic field generated by the rotating encoder wheel.

EP-A-0 607 719 discloses a sealing device for bearings incorporating a magnetized ring. The axially outer surface of a metal insert of the sealing device is covered with an elastomeric material charged with metal magnetic particles which also has a sealing function. The cover layer of elastomeric material must be of a relevant thickness in order to generate a sufficiently strong magnetic field to be sensed by the sensor device.

A variant solution provides for a rubber or elastomeric lip being vulcanized onto the annular metal insert. A further layer of elastomeric material charged with magnetized particles is then vulcanized covering the axially outer radial surface of the first rubber or elastomeric material. This solution, while having the limits of the previously discussed one, further requires a complicated and expensive manufacturing process.

EP-A-0 725 242 discloses an elastomeric encoder wheel glued to a support metal insert.

In other known solutions, for example as mentioned in EP-A-0 647 851, a plastic ring containing metal particles (plastoferrite ring) is co-moulded or glued onto the metal insert. The use of plastoferrite is advantageous in that it allows to obtain higher magnetization levels as compared to conventional elastomeric rings charged with magnetized particles. However, the use of plastoferrite has a drawback concerning the difference of the thermal dilatation coefficients of the plastic forming the encoder ring and the steel of the metal insert. Therefore, this solution is not applicable with motor vehicle wheel hub bearing units, where the heat generated by the near brakes causes thermal variations compromising the adherence between the encoder wheel of plastoferrite and its steel supporting annular disc.

SUMMARY OF THE INVENTION

Against the foregoing background, it is the primary object of the present invention to provide an improved encoder wheel capable of reaching higher magnetization levels while overcoming the above prior art drawbacks due to thermal variations.

Toward the attainment of these and additional objects and advantages, the present invention, briefly summarized, provides a device for measuring relative revolving speed between the races of a rolling contact bearing fitted at one end thereof with a sealing device, wherein said sealing device comprises a metal insert of annular shape fast for rotation with the rotating race of the bearing, and the speed measuring device comprises a multipolar ring mounted to said metal insert and provided with magnetized segments of alternate polarity in the circumferential direction, characterized in that said multipolar ring is a ring of plastoferrite co-moulded to said insert, and that on said insert there is formed a plurality of radial recesses adapted to yield, in the co-moulding operation, a corresponding plurality of radial protrusions in the multipolar ring, said radial recesses and protrusions being mutually engaged so as to prevent relative rotation between the multipolar ring and the metal insert, but allow relative radial displacement owing to thermal variations.

BRIEF DESCRIPTION OF THE DRAWINGS

In order that the present invention may be well understood there will now be described a few preferred embodiments thereof, given by way of example, reference being made to the accompanying drawings, in which.

DETAILED DESCRIPTION OF PREFERRED EMBODIMENTS

Figure 1:
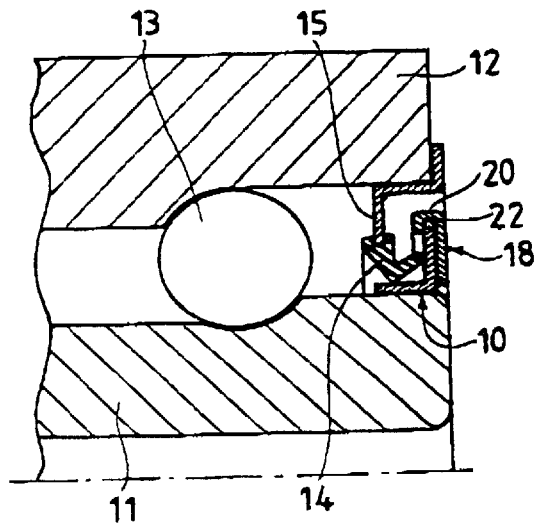
FIG. 1 is a schematical partial axial cross sectional view of a rolling contact bearing fitted with a device according to the present invention.
Figure 2:
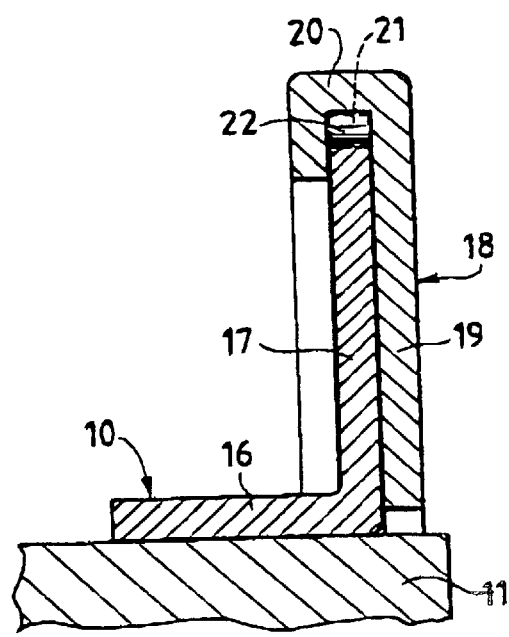
FIG. 2 is an enlarged view of a detail of FIG. 1 showing a multipolar magnetized ring co-moulded to a supporting annular metal insert being part of the sealing device of the bearing.

With reference to FIGS. 1 and 2, numeral 10 designates a metal insert of annular shape, known per se, being part of a device for sealing the annular gap between the races 11 and 12 of a rolling contact bearing. A set of rolling elements 13, in this example bearing balls, are interposed between the races 11, 12. The sealing device also comprises an annular sealing gasket 14 kept in sliding contact against the axially inner side of the insert 10. The sealing gasket 14 is fixed to an annular insert 15 fast with the stationary bearing race 12. The sealing device performs the dual function of preventing infiltration of polluting agents (water, dust, mud) into the inner parts of the bearing and containing the grease for lubricating the bearing balls and raceways.

As shown in FIG. 2, the metal insert 10 has a substantially L-shape in axial cross section, wherein there can be distinguished a cylindrical portion 16 forcefully fitted on a radially inner rotating race 11 of the bearing, and a radial flange portion 17.

According to the present invention, an encoder ring element 18 of plastoferrite is co-moulded to the metal insert 10. The encoder ring 18 provides magnetized segments of alternate polarity in the circumferential direction and is part of a device for measuring the mutual rotational speed between the rotating and stationary races of the bearing. The magnetized ring 18 is arranged facing a sensor (not shown) responsive to magnetic field variations and mounted on the stationary part of the bearing unit or to another non-rotating supporting element.

The plastoferrite ring 18 is co-moulded to the metal insert 10 so as to form a radial portion 19 covering the outer side of radial flange portion 17 and facing the sensor, and a peripheral portion 20 covering the circumferential edge of radial flange portion 17. The peripheral portion 20 serves to axially lock the multipolar ring 18 onto its supporting metal insert 10.

Figure 3:
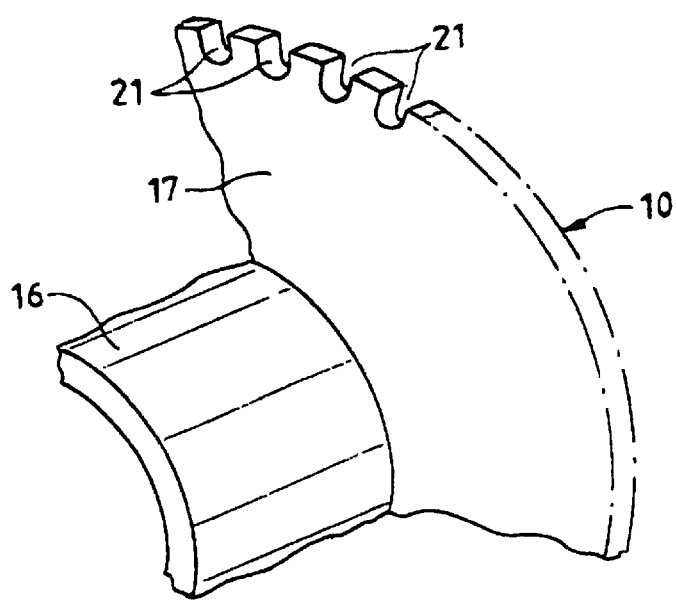
FIG. 3 is a schematical, partial perspective view of the insert of FIG. 2.

Still in accordance with the present invention, as shown in FIG. 3, formed in the outer circumferential edge of a radial flange portion 17 is a plurality of radial recesses 21. Radial recesses 21 are adapted to yield, in the co-moulding operation, a corresponding plurality of radial protrusions 22 in the multipolar ring 18. Owing to the mutual engagement of the radial recesses and protrusions 21, 22, relative rotation between the multipolar ring 18 and the metal insert 10 is prevented, while allowing the magnetized ring to radially expand and shrink when subject to any thermal variation acing on the bearing. This arrangement allows the plastoferrite ring to accomplish a limited radial sliding motion along the recesses of the metal insert.

It is of primary importance that the magnetized ring and the metal insert are free to accomplish said limited relative radial displacements.

To prevent the plastoferrite from adhering to the metal in the co-moulding operation, preferably the insert undergoes a special anti-adherence treatment, such as greasing or phosphating, prior to the co-moulding step.

Besides being mechanically locked for rotation owing to the above described arrangement, the multipolar magnetized ring and its metal support insert are further axially locked due to the magnetic attraction of the north-south adjacent poles, the lines of force of which close through the metal insert. Such an attraction, however, does not impede relative movement of the two bodies owing to different thermal dilatation.

Figure 4:
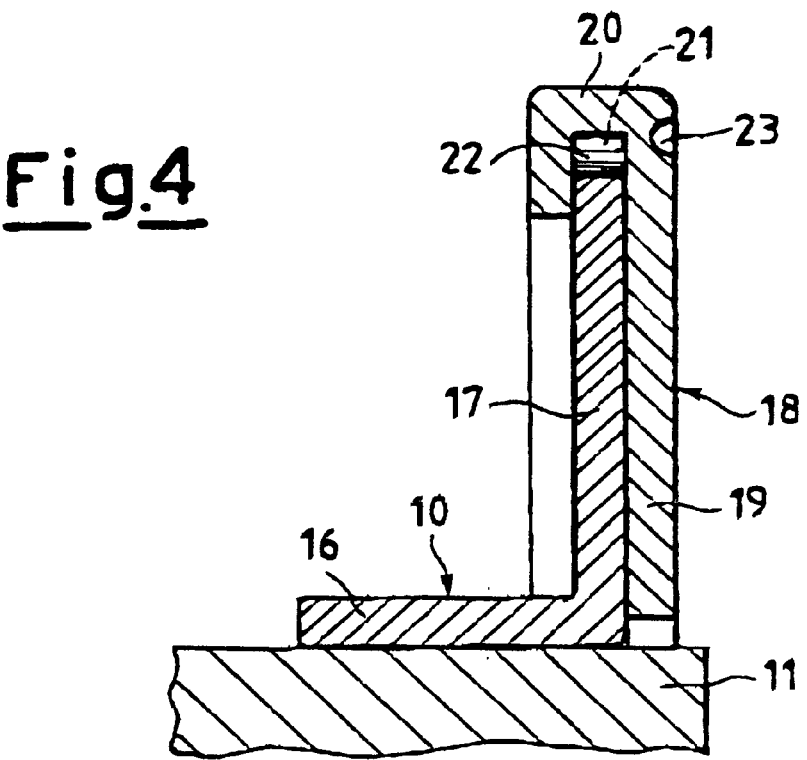
FIGS. 4 and 5 are cross sectional views similar to that of FIG. 2 but showing respective alternative embodiments of this invention.
Figure 5:
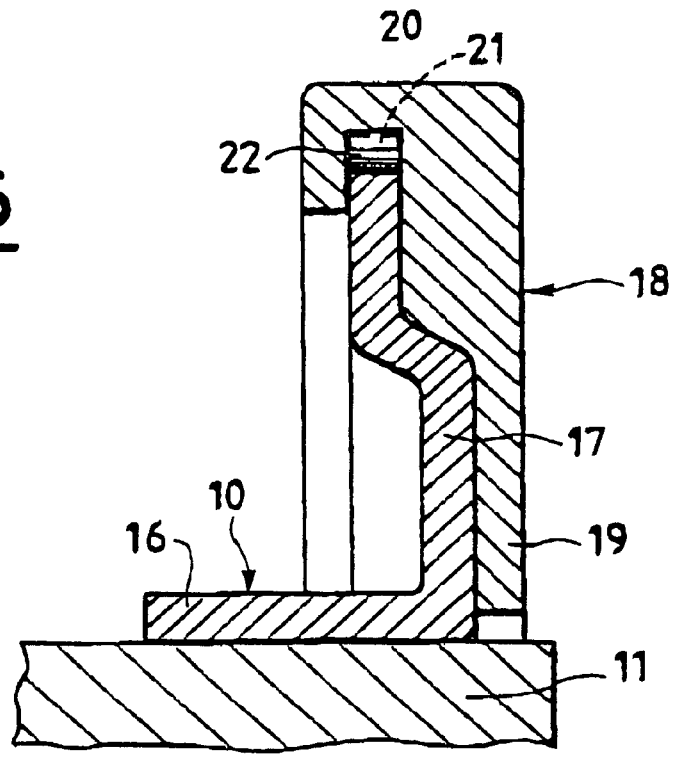

Referring to FIGS. 4 and 5, there are illustrated two further embodiments of the present invention. In FIG. 4, a circumferential groove 23 is formed on the outer side of the plastoferrite ring 18 at the level of the recesses and protrusions 21, 22, in order to reduce the thickness of the plastoferrite cross section in that point and so facilitate small relative movements between the multipolar ring and the insert. In FIG. 5 there is used an insert of conventional design, wherein the edge of radial flange portion 17 is inclined towards the inside of the bearing.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing examples. For example, the radial recesses 21 of insert 10 could also be realized in form of radial slits or splines on the flange portion 17, as far as this form impedes relative rotation but allows radial displacement between the magnetized ring and its metal support.

What is claimed is:

1. A device for measuring relative revolving speed between rates of a rolling contact bearing, the device comprising:

a sealing device comprising a metal insert of annular shape fast for rotation with a rotating race of the bearing, the sealing device being fitted at one end of the device for measuring relative revolting speed; and a multipolar ring mounted to said insert and provided with magnetized segments of alternate polarity in a circumferential direction;

wherein said multipolar ring is it ring of plastoferrite that is co-moulded to said insert, and that on said insert there is formed a plurality of radial recesses adapted to yield, during co-moulding, a corresponding plurality of radial protrusions in the multipolar ring, said radial recesses and protrusions being mutually engaged so as to prevent relative rotation between the multipolar ring and the metal insert, but allow relative radial displacement owing to thermal variations.

2. A device according to claim 1, wherein said radial recesses are formed in an outer circumferential edge of a radial flange of said insert.

3. A device according to claim 1, wherein said plastoferrite multipolar ring is co-moulded to said metal insert so as to form a radial portion that covers an outer side of a radial flange of said insert, and a peripheral portion that covers the circumferential edge of said flange and axially locks the multipolar ring onto its supporting metal insert.

4. A device according to claim 1, wherein before co-moulding the plastoferrite ring to metal insert, said insert undergoes and anti adhesion treatment for preventing the plastoferrite from adhering to the metal during co-moulding.

* * * * *